(12) United States Patent
Leppert

(10) Patent No.: US 6,270,702 B1
(45) Date of Patent: Aug. 7, 2001

(54) METHOD FOR MANUFACTURING SCINTILLATOR CERAMIC

(75) Inventor: Juergen Leppert, Forchheim (DE)

(73) Assignee: Siemens Aktiengesellschaft, Münich (DE)

( * ) Notice: Subject to any disclaimer, the term of this patent is extended or adjusted under 35 U.S.C. 154(b) by 0 days.

(21) Appl. No.: 09/532,075

(22) Filed: Mar. 21, 2000

(30) Foreign Application Priority Data

Mar. 25, 1999 (DE) ................................................ 199 13 545

(51) Int. Cl.⁷ ...................................................... C09K 11/00
(52) U.S. Cl. .............................. 264/21; 264/102; 264/667
(58) Field of Search ................................ 264/21, 102, 667

(56) References Cited

U.S. PATENT DOCUMENTS

| | | |
|---|---|---|
| 3,502,590 | 3/1970 | Royce et al. . |
| 4,863,882 | 9/1989 | Matsuda et al. . |
| 5,296,163 | 3/1994 | Leppert et al. . |
| 5,518,659 * | 5/1996 | Rossner et al. .................. 252/301.4 |
| 5,676,891 * | 10/1997 | Boedinger ........................... 264/1.22 |

* cited by examiner

*Primary Examiner*—Christopher A. Fiorilla
(74) *Attorney, Agent, or Firm*—Schiff Hardin & Waite

(57) ABSTRACT

In a method for manufacturing scintillator ceramic by hot pressing a powder containing at least one rare earth oxisulfide (rare earth oxisulfide powder), in order to avoid light propagation due to carbonized imperfections in the ceramic, sulfur oxyacid anions are added to the rare earth oxisulfide powder prior to hot pressing.

5 Claims, 1 Drawing Sheet

METHOD FOR MANUFACTURING SCINTILLATOR CERAMIC

BACKGROUND OF THE INVENTION

1. Field of the Invention

The present invention is directed to a method for the manufacture of scintillator ceramic by hot pressing a powder containing at least one rare earth oxisulfide (rare earth oxisulfide powder).

2. Description of the Prior Art

Scintillator elements of the detector elements in the radiation detector system are for computed tomography (CT) are manufactured as scintillator ceramic from rare earth oxisulfides. When irradiated by x-rays, such scintillator elements produce light that is coupled out from the translucent ceramic and is converted by a photodiode into an electrical signal.

Since the intensity of the light produced by scintillator element is a measure for the intensity of the incident radiation, the output current of the photodiode represents a measure for the intensity of the radiation incident on a scintillator element.

Because of its limited by the oxygen sensitivity of the rare earth oxisulfide at elevated temperatures, the compression of the rare earth oxisulfide powder into ceramic by means of hot pressing can take place only under protective gas or in a vacuum since, temperatures of up to 1,500° C. are required.

In the manufacture of rare earth oxisulfide powder and in the handling thereof, contamination by dust and abrasion particles is unavoidable. These particles are then carbonized as a result of the high temperatures during hot pressing and remain as black specks in the finished ceramic. If the scintillator element contains such imperfections, the light propagation in the scintillator element is disturbed, and such a ceramic is unsuitable as a detector for x-ray in so far as the imperfection exceeds a specific level.

In scintillator ceramic manufactured according to known methods, reject rates of a not inconsiderable level occur due to these reasons.

German OS 37 02 357 discloses supporting discoloration of a rare earth oxisulfide ceramic article pressed from rare earth oxisulfide particles by a heat treatment between 400 to 800° C. in air prior to an isostatic hot pressing. The surfaces of the rare earth oxisulfide powder particles are thereby oxidized by the formation of a limited amount of rare earth oxisulfate, and this the rare earth oxisulfide is not oxidized to rare earth oxisulfate in the interior of the rare earth oxisulfide powder particles. A discoloration of rare earth oxisulfides is therefore suppressed during hot pressing by means of the formation of rare earth oxisulfate on the surfaces of the rare earth oxisulfide powder particles.

SUMMARY OF THE INVENTION

An object of the present invention is to provide a method of the above type that permits the manufacture of scintillator ceramic having a reduced rejection rate.

The above object is achieved in accordance with the invention in a method for manufacturing of scintillator ceramic by hot pressing a powder containing at least one rare earth oxisulfide, with sulfur oxyacid anions being added to the rare earth oxisulfide powder prior to hot pressing.

The added sulfur oxyacid anions form oxisulfates with the rare earth ions that are present in the rare earth oxisulfide powder during the heating of the rare earth oxisulfide powder which take place in the hot pressing in a protective gas or in a vacuum. These decay at 800° C. or higher, into the corresponding oxide and sulfur trioxide. Sulfur trioxide is an oxidizing agent that oxidizes carboniferous particles to carbon dioxide or carbon monoxide, and is itself reduced into sulfur dioxide or sulfur. Carbonized particles that might be present are therefore reduced in size or disappear completely as a result of the oxidation. Since gas is thereby released in the rare earth oxisulfide powder, the method is particularly well-suited for uniaxial hot pressing, since the gases can then escape unhindered. In the case of isostatic hot pressing—which is also possible—alkaline substances must be introduced into the envelope which can bind the gases being released.

The sulfur oxyacid anions are added in the form of sulfate ions and/or sulfite ions, the sulfate ions being added, for example, in the form of sulfates, hydrogen sulfates or thiosulfates, and the sulfite ions being added, for example, in the form of sulfites or hydrosulfites. It is preferred to add sulfates, since sulfates of many elements can be purchased and need not be specifically synthesized for the purposes of the present invention.

The harmful effect of calcium ions in scintillator ceramic disclosed in U.S. Pat. No. 3,502,590 is avoided by adding the sulfate ions and/or sulfite ions in the form of at least one combination of $R_2A$ or $RA$, whereby R is from the group H, Li, Na, K, Cs, $NH_4$, and A is from the group $SO_4$ (sulfate), $SO_3$ (sulfite), $HSO_4$ (hydrogen sulfate), $HSO_3$ (hydrogen sulfite), $S_2O_3$ (thiosulfate). Alternatively, these harmful effects can be avoided by adding the sulfate ions and/or sulfite ions in the form of at least one sulfate and/or sulfite of at least one of the rare earths contained in the rare earth oxisulfide powder.

The generation of foreign phase occlusions from compression additives disclosed in German PS 42 24 931 is avoided by adding 0.0001 to 0.05 mole, preferably 0.0025 to 0.01 mole, of sulfur oxyacid anions to the rare earth oxisulfide powder per mole of sulfide ions of the rare earth oxisulfide powder.

DESCRIPTION OF THE DRAWINGS

The single FIGURE shows the decrease in the reject rate that is achievable by means of the inventive method.

DESCRIPTION OF THE PREFERRED EMBODIMENTS

Example 1

Figure 1:
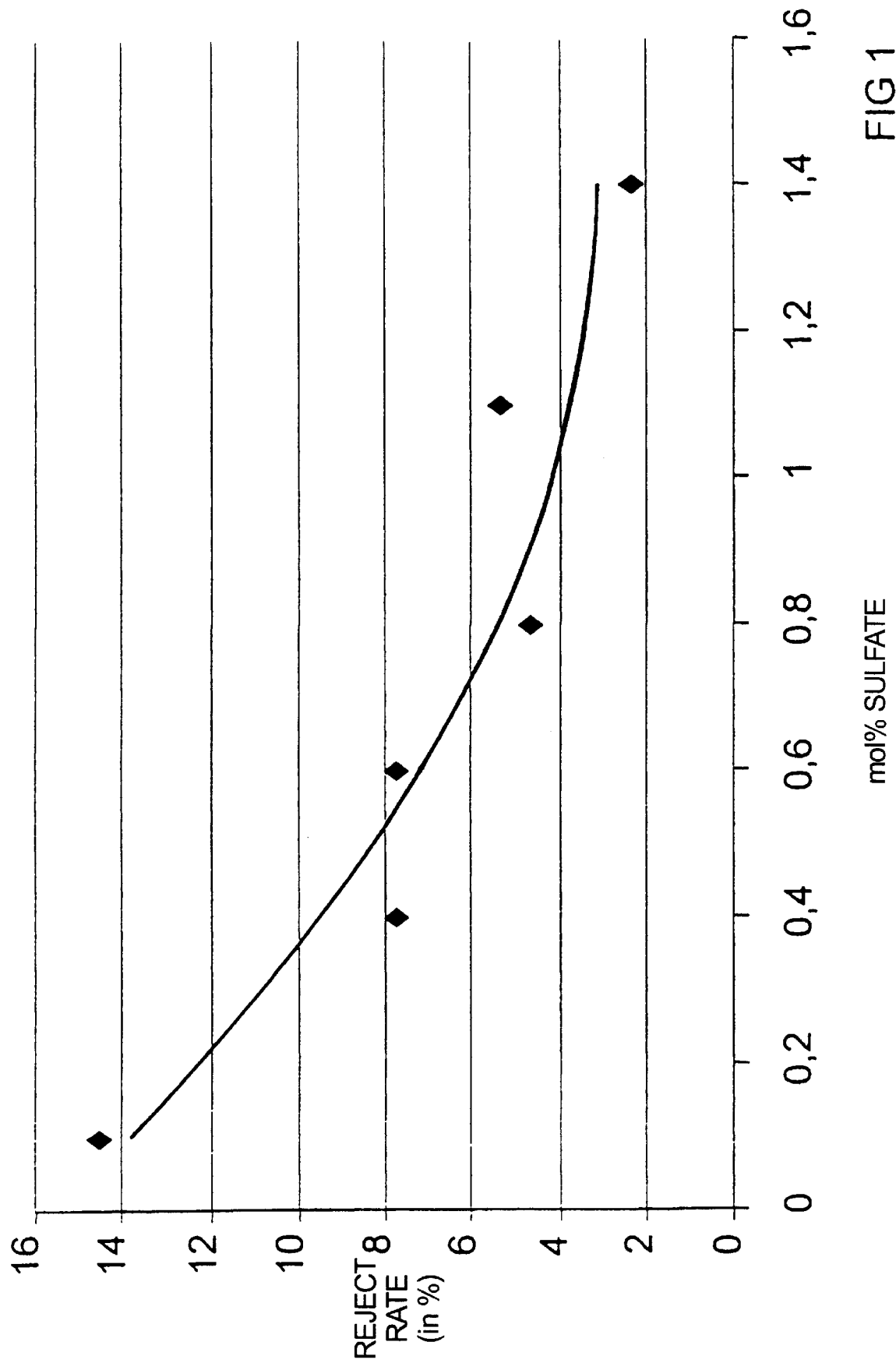

Scintillator ceramic is to be manufactured from rare earth oxisulfide powder that is produced, for example, in a manner disclosed in German PS 42 24 931, and contains gadolinium as the rare earth.

Additionally, sulfur oxyacid anions are added to the gadolinium sulfide powder as well as sintering agents, as well as other as may be needed agents and at least one doping substance that contains at least one element of the group Pr, Eu, Tb, Dy, Ho, Er, Yb, Sm, Ce.

Per mole of sulfide ions of the gadolinium oxisulfide powder, 0.0001 to 0.05 mole, preferably 0.0025 to 0.01 mole, of sulfur oxyacid anions are added to the gadolinium oxisulfide powder.

The addition of the sulfur oxyacid anions ensues in the form of sulfate ions or sulfite ions in the form of at least one sulfite, sulfate and/or thiosulfate of at least one of the said elements present in one of the doping substances contained in the gadolinium oxisulfide powder.

Subsequently, the thus-prepared gadolinium sulfide powder—possibly after a cold pre-pressing —is pressed to a cylindrical block having a volume of 125 ml by hot pressing at temperatures of at least 800° C., preferably temperatures between 1,000° C. and 1,500° C. The hot pressing is preferably uniaxial pressing.

From such a block, disks of 9.7 ml are sawed that serve as blanks for the manufacture of scintillator elements.

Using these blanks, images are made of the light produced by luminescence that occurs during irradiation with x-rays, the light being registered with a CCD camera. If point deviations of the intensity of the luminescence light, and thus of the output signals of the CCD camera, appear that exhibit a decrease of the light intensity of more than 2.5% compared to the ambient area and an extent of more than 0.3 mm, it is assumed that there are specific distortions caused by a carbonization, with the result that the blank in question is discarded as a reject.

Example 2

This example differs from Example 1 in that the addition of sulfate ions and/or sulfite ions ensues, by adding at least one compound of the form $R_2A$, wherein R is a substance of the group H, Li, Na, K, Cs, $NH_4$, and A is a substance of the group $SO_4$, $SO_3$, $S_2O_3$, and/or by adding at least one compound of the form RA, wherein R is a substance of the group H, Li, Na, K, Cs, $NH_4$ and A is a substance of the group $HSO_4$ (hydrogen sulfate), $HSO_3$ (hydrogen sulfite).

Example 3

This example differs from the above examples in that the addition of the sulfate ions or sulfite ions ensues in the form of a sulfate and/or sulfite of the rare earth contained in the rare earth oxisulfide powder, i.e. in the form of gadolinium sulfate or gadolinium sulfite.

In FIG. 1 the percentage reject rate for Example 3 is shown dependent on the sulfur oxyacid anion content in mole % (=0.01 mole) in the case of adding sulfate ions. It clearly can be seen that in the inventive method reject rates of under 5% are achievable. It is also clear that without the addition of sulfur oxyacid anions the reject rate is on the magnitude of at least 15%.

In the described examples, the rare earth oxisulfide powder contains only one rare earth oxisulfide, namely gadolinium oxisulfide. In the scope of the invention the rare earth oxisulfide powder can contain, however, one rare earth oxisulfide or several rare earth oxisulfides of the group $Y_2O_2S$, $La_2O_2S$, $Gd_2O_2S$, $Lu_2O_2S$. In this case, given a rare earth oxisulfide powder manufactured analogously to Example 3, the sulfate ions and/or sulfite ions are added to at least one rare earth contained in the rare earth oxisulfide powder in the form of at least one sulfate and/or sulfite. The addition of the sulfur oxyacid anions analogously to the Examples 1 and 2 can ensue.

The volume cited in connection with Example 1 for the block produced by pressing is only an example. Other volumes and forms are possible within the scope of the invention.

Although modifications and changes may be suggested by those skilled in the art, it is the intention of the inventor to embody within the patent warranted hereon all changes and modifications as reasonably and properly come within the scope of his contribution to the art.

I claim as my invention:

1. A method for manufacturing a scintillator ceramic, comprising the steps of:

providing a powder containing at least one rare earth oxisulfide;

adding 0.0001 to 0.05 mole of ions, selected from the group consisting of sulfate ions and sulfite ions, to said powder per mole of sulfide ions in said powder;

said ions being added in at least one form selected from the group consisting of a sulfate of said at least one rare earth, a sulfite of said at least one rare earth, a compound $R_2A$, and a compound RA, wherein R is selected from the group consisting of H, Li, Na, K, Cs and $Nh_4$, and wherein A is selected from the group consisting of $SO_4$, $SO_3$, $HSO_4$, HSO, and $S_2O_3$; and after adding said ions, hot-pressing said powder at a temperature of at least 800° C. in an environment selected from the group consisting of a protective gas and a vacuum.

2. A method as claimed in claim 1 wherein the step of providing a powder comprises providing a powder containing at least one doping substance, and wherein the step of adding said ions comprises adding said ions as a compound of said at least one doping substance selected from the group consisting of at least one sulfate of said doping substance, at least one thiosulfate of said doping substance, and at least one sulfite of said doping substance.

3. A method as claimed in claim 2 wherein said doping substance is a doping substance containing at least one element selected from the group consisting of Pr, Eu, Tb, Dy, Ho, Er, Yb, Sm and Ce.

4. A method as claimed in claim 1 wherein the step of providing a powder comprises providing a powder containing at least one rare earth oxisulfide selected from the group consisting of $Y_2O_2S$, $La_2O_2S$, $Gd_2O_2S$ and $Lu_2O_2S$.

5. A method as claimed in claim 1 comprising adding 0.0025 to 0.01 mole of sulfur oxyacid anions to said powder per mole of sulfide ions in said powder.

* * * * *